US005600807A

United States Patent [19]
Itoh et al.

[11] Patent Number: 5,600,807
[45] Date of Patent: Feb. 4, 1997

[54] PROGRAMMABLE CONTROLLER CAPABLE OF UPDATING A USER PROGRAM DURING OPERATION BY SWITCHING BETWEEN USER PROGRAM MEMORIES

[75] Inventors: Atsushi Itoh; Tsutomu Sunaga, both of Hunabashishi, Japan

[73] Assignee: Hitachi, Ltd., Tokyo, Japan

[21] Appl. No.: 231,642

[22] Filed: Apr. 22, 1994

Related U.S. Application Data

[63] Continuation of Ser. No. 672,123, Mar. 19, 1991, abandoned.

[30] Foreign Application Priority Data

Mar. 19, 1990  [JP]  Japan ........................................ 2-66792

[51] Int. Cl.$^6$ ............................................ G06F 9/445
[52] U.S. Cl. ..................................... 395/421.01
[58] Field of Search .................... 364/DIG. 1, DIG. 2; 395/425, 375, 500, 700, 800, 200, 400

[56] References Cited

U.S. PATENT DOCUMENTS

| 4,257,097 | 3/1981 | Moran ........................................ 395/425 |
| 5,012,408 | 4/1991 | Conroy ................................. 364/DIG. 1 |
| 5,144,242 | 9/1992 | Zeilenga et al. .......................... 324/312 |

*Primary Examiner*—Robert B. Harrell
*Attorney, Agent, or Firm*—Antonelli, Terry, Stout & Kraus, LLP

[57] ABSTRACT

A programmable controller, including at least a sequence processor, has plural memories for storing user programs which can be accessed by the same addresses from the sequence processor. The memories are selectively enabled in response to a mode signal and an access signal from the sequence processor. In this way, switching between memories enables the sequence processor to switch its processing from one user program to another without the need to transfer the user programs from one memory to another. Where an additional control processor is included in the programmable controller for updating user programs, it is possible to enable access by the sequence processor to one memory and the control processor to another memory during the same instruction cycle.

16 Claims, 5 Drawing Sheets

| SET POINT | SELECTED STATE |
|---|---|
| 1 | PROGRAM EXECUTING MICROCOMPUTER EXECUTES USER PROGRAM #1<br>PROGRAM CONTROLLING MICROCOMPUTER ACCESSES USER PROGRAM #1 |
| 2 | PROGRAM EXECUTING MICROCOMPUTER EXECUTES USER PROGRAM #2<br>PROGRAM CONTROLLING MICROCOMPUTER ACCESSES USER PROGRAM #2 |
| 3 | PROGRAM EXECUTING MICROCOMPUTER EXECUTES USER PROGRAM #1<br>PROGRAM CONTROLLING MICROCOMPUTER ACCESSES USER PROGRAM #2 |
| 4 | PROGRAM EXECUTING MICROCOMPUTER EXECUTES USER PROGRAM #2<br>PROGRAM CONTROLLING MICROCOMPUTER ACCESSES USER PROGRAM #1 |

*FIG. 2*

PROGRAMMABLE CONTROLLER CAPABLE OF UPDATING A USER PROGRAM DURING OPERATION BY SWITCHING BETWEEN USER PROGRAM MEMORIES

This application is a continuation of now abandoned application Ser. No. 07/672,123, filed Mar. 19, 1991.

BACKGROUND OF THE INVENTION

The present invention relates to a programmable controller and, more particularly, to a programmable controller of the type which is adapted to update the contents of a user program while that program is running.

Programmable controllers with an ability to update the contents of a user program while the program is being executed have become commonplace. One such programmable controller is disclosed in Japanese Patent Laid-open No. 63-214806. This programmable controller comprises a first memory containing a user program A to be executed by a sequence processor and a second memory containing a user program B. The contents of the second memory may be transferred to the first memory by an update instruction so that the sequence processor may execute the user program B instead of the program A.

One disadvantage of the above-mentioned program controller is that when the user programs are switched for execution by the sequence processor, it takes a significant time to transfer the new user program from the second memory to the first. During the program transfer, the sequence processing must come to a halt. The suspension of the processing represents a significant inconvenience especially where large-size user programs are involved.

One way to circumvent this problem is to provide a function for directly updating part of the user program in the first memory to be accessed by the sequence processor. However, this can result in complications. For example, if a wrong part of the user program is updated, e.g., if an added jump instruction is not matched with its destination, the update will be invalid, while the sequence processor executing the user program successively in the first memory finds it difficult to activate a verification program concurrently for checking for such update errors. With the prior art, such update errors cannot be detected and resolved properly.

SUMMARY OF THE INVENTION

It is therefore an object of the present invention to provide a programmable controller which is capable of updating a user program easily and quickly.

In achieving the foregoing and other objects of the present invention and according to a first aspect thereof, there is provided a programmable controller having two memories which can be accessed by the same addresses; a sequence processor which executes a user program stored in one of the two memories; a control processor which accesses and updates a user program stored in the other memory at a time when the sequence processor is not using a bus arrangement; and a memory selection which selects one of the two memories for access by the sequence processor and the other memory for access by the control processor.

According to a second aspect of the present invention, there is provided a programmable controller comprising two memories which contain user programs to be executed by a sequence processor using the same addresses; a memory selector which selects one of the two memories so as to select the user program therein to be executed by the sequence processor; and a device for updating the user program in the other memory.

As a basic feature of the present invention, there are provided two memories to be accessed by the sequence processor using the same addresses. While the sequence processor is executing a user program in one of the memories, the other memory is accessed so that another user program therein may be edited or otherwise handled. Because the editing takes place by use of the other memory, a verification program may be run concurrently to check the program in the first memory. Where user programs are to be switched, the new memory to be accessed by the sequence processor is selected instead of the programs being transferred between the memories. This makes it possible to perform the sequence processing uninterrupted.

BRIEF DESCRIPTION OF THE DRAWINGS

FIG. 2 is a chart illustrating how two memories are to be selected by register set points;

DETAILED DESCRIPTION OF A PREFERRED EMBODIMENT

Figure 1:
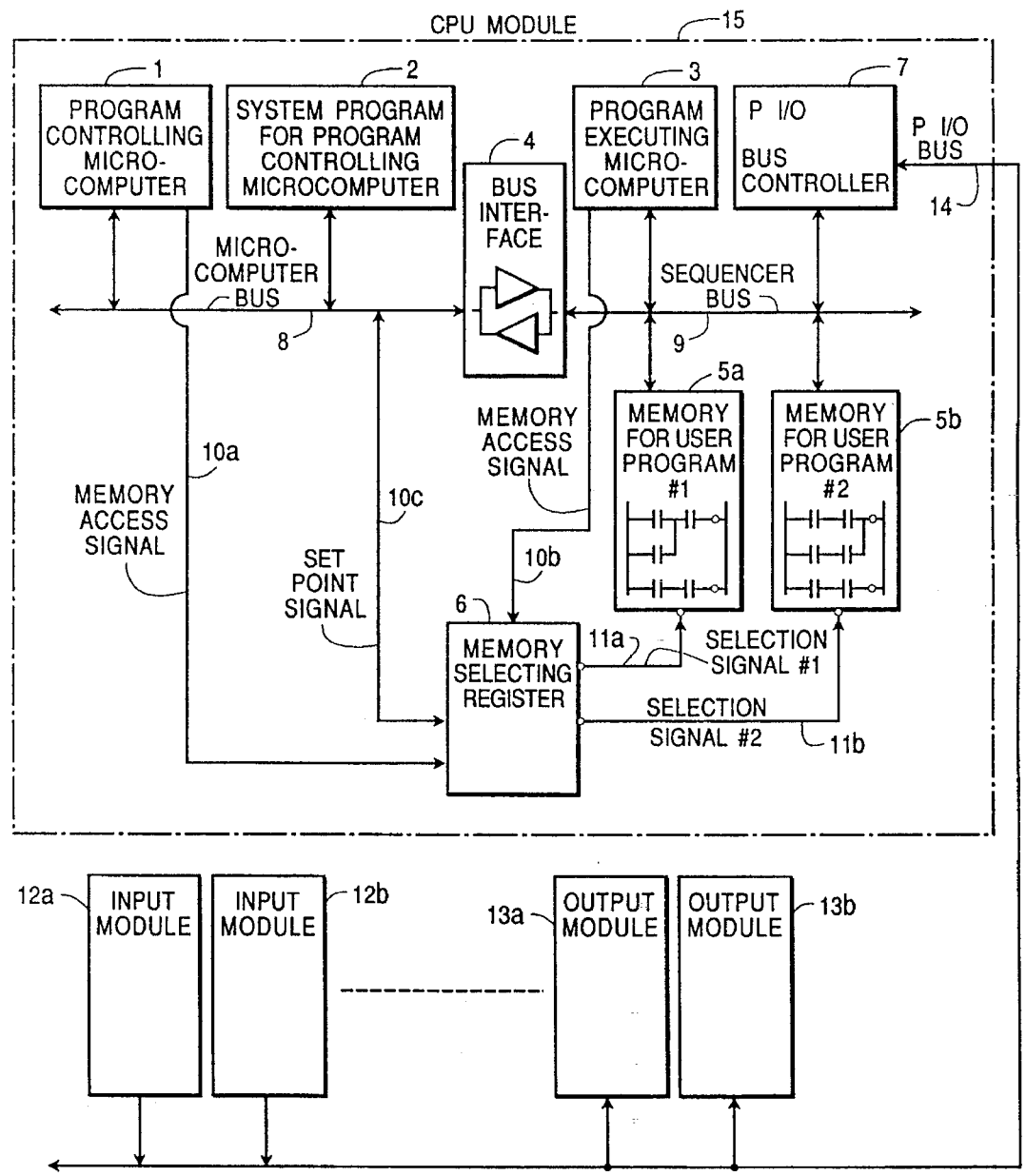
FIG. 1 is a block diagram of a programmable controller which forms a preferred embodiment of the present invention.

A preferred embodiment of the present invention will now be described with reference to the accompanying drawings. FIG. 1 is a block diagram of a programmable controller embodying the present invention.

In FIG. 1, a CPU module 15 of the programmable controller is connected to input modules 12a, 12b, ..., and to output modules 13a, 13b, ..., by an PI/O bus 14.

The CPU module 15 comprises a program executing microcomputer 3 which operates as a sequence processor, a PI/O bus controller 7 to which the PI/O bus 14 is connected, two user program memories 5a and 5b which are accessed by the microcomputer 3 using the same addresses, and a sequencer bus 9 which interconnects these elements. The CPU module 15 also contains a program controlling microcomputer 1 for verifying and controlling user programs, a memory 2 containing the system program for the program controlling microcomputer 1, and a microcomputer bus 8 which connects the microcomputer 1 with the memory 2. The sequencer bus 9 is connected to the microcomputer bus 8 via a bus interface 4.

Furthermore, the CPU module 15 comprises a memory selecting register 6 which selects one of the user program memories 5a and 5b using selection signals 11a and 11b and connects the selected memory to the sequencer bus 9. The memory selecting register 6 receives a memory access signal on line 10a from the program controlling microcomputer 1, a memory access signal on line 10b from the program executing microcomputer 3, and a set point (mode) signal also from the microcomputer 1 on line 10c. The output from the register 6 is the selection signals on lines 11a and 11b. The user programs stored in the memories 5a and 5b will be referred to as user programs #1 and #2, respectively, in the description that follows.

Figure 5:
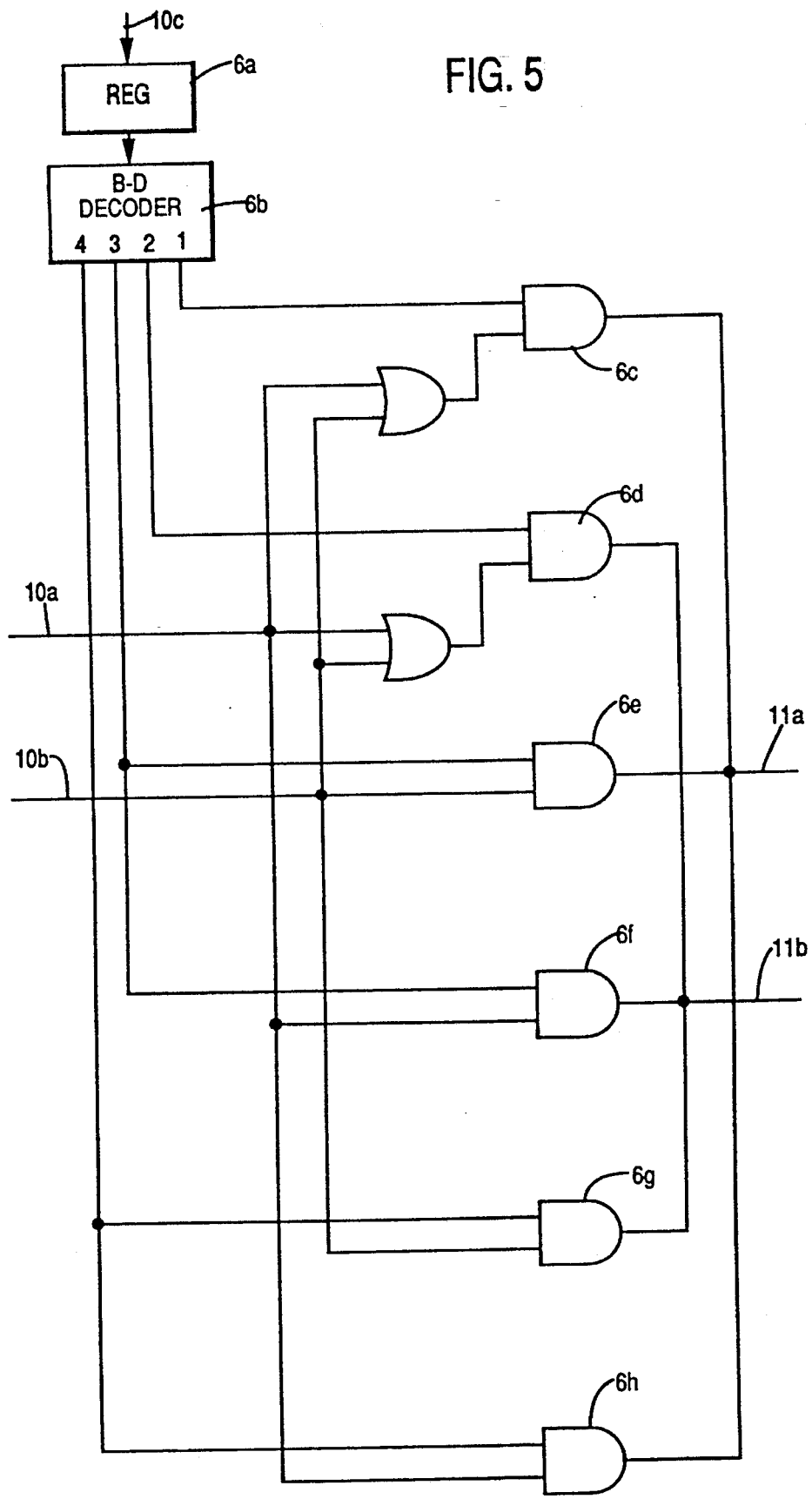
FIG. 5 is a schematic diagram of an example of the memory selecting register.

In this embodiment, four set point signals shown in FIG. 2 are used, and an example of a logic circuit capable of performing the required logic operations is shown in FIG. 5. With set point "1" placed in the register 6a, the memory 5a is selected via gate 6c by a selection signal on line 11a, if an access signal is received on either lines 10a or 10b from the microcomputers 1 and 3. With set point "2" placed in the register 6a, the memory 5b is selected via gate 6d by the selection signal on line 11b, if an access signal is received on either of lines 10a or 10b from the microcomputers 1 and 3. With set point "3" placed in the register 6a, the memory 5a is selected via gate 6e by the output of the selection signal on line 11a from the register 6, if an access signal on line 10b is received from the program executing microcomputer 3; whereas, if an access signal on line 10a is received from the program controlling microcomputer 1, the memory 5b is selected via gate 6f by the output of the selection signal on line 11b from the register 6. With set point "4" placed in the register 6a, the memory 5b is selected via gate 6g by the output of the selection signal on line 11b from the register 6, if an access signal 10b is received from the program executing microcomputer 3; whereas, if an access signal on line 10a is received from the program controlling microcomputer 1, the memory 5a is selected via gate 6h by the output of the selection signal on line 11a from the register 6. The decoder 6b in FIG. 5 is a standard binary-decimal decoder.

Figure 3:
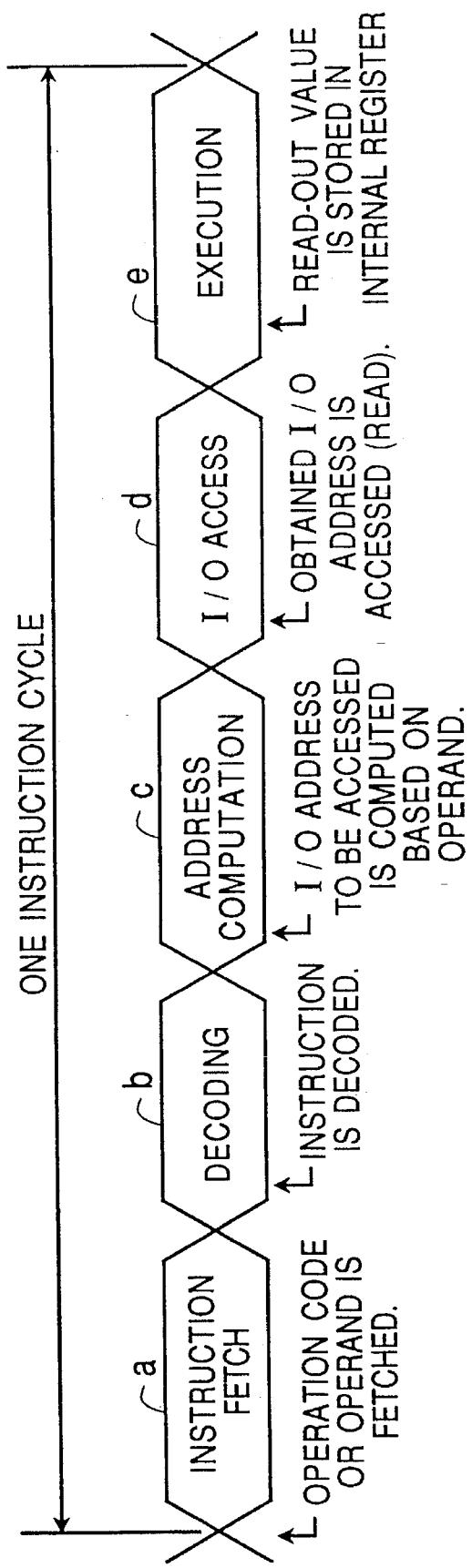
FIG. 3 is a view depicting one instruction cycle of the sequence processor.

FIG. 3 is a view showing an instruction cycle of the program executing microcomputer 3. One instruction cycle of the microcomputer 3 comprises an instruction fetch operation "a", a decode operation "b", an address computation "c", an I/O access operation "d", and execution "e". The sequencer bus 9 is monopolized during the instruction fetch operation "a" and I/O access operation "d". When the microcomputer 3 is in a decode operation "b", address computation "c" or execution "e", the sequencer bus 9 is free. During this bus free period, the program controlling microcomputer 1 may use the sequencer bus 9.

The programmable controller whose construction is described above works as follows. When the program controlling microcomputer 1 sets a set point "1" into the register 6a of memory selecting register 6, the program executing microcomputer 3 outputs the access signal on line 10b to the register 6 and places an address signal onto the sequencer bus 9 in order to read a user program instruction from memory. Because the memory 5a is selected by the register 6, the address signal causes the user program #1 in the memory 5a to be accessed. The program executing microcomputer 3 proceeds to fetch and execute the suitable instruction according to the instruction cycle of FIG. 3.

If the program controlling microcomputer 1 wishes to read out the user program #1 being executed by the program executing microcomputer 3 so as to duplicate it in an external memory while the program executing microcomputer 3 is processing an instruction, the program controlling microcomputer 1 causes an access signal to be output to the register 6 on line 10a and an address signal to be placed on the microcomputer bus 8 in the cycle in which the program executing microcomputer 3 is not using the sequencer bus 9. Because the memory 5a is selected by the selection signal 11a from the register 6, the address signal on the microcomputer bus 8 is placed on the sequencer bus 9 via the bus interface 4. This causes the user program #1 to be read out of the memory 5a onto the sequencer bus 9 and to be accessible to the program controlling microcomputer 1 via bus interface 4 and microcomputer 8. If the user program to be executed is stored in the memory 5b, a set point "2" is set in the register 6, and the subsequent process is the same as described above.

If it is desired to modify the user program #1 being executed while it is stored in the memory 5a, a set point "3" is set in the register 6, so as to allow the program executing microcomputer 3 to selectively access memory 5a and the program controlling microcomputer 1 to selectively access memory 5b. The program executing microcomputer 3 continues reading the user program #1 from the memory 5a for execution, which allows the program controlling microcomputer 1 to access the memory 5b when the sequencer bus 9 is not occupied. This makes it possible to update the user program #1 that was moved to the external memory, as described above, and to have the program controlling microcomputer 1 store the updated user program #2 into the memory 5b. The updating may be carried out by an external programming device and the updated program may be checked for error thereafter. The user program may also be checked by the program controlling microcomputer 1 after being stored into the memory 5b. Where no external programming device is used, the user program #1 may be copied into the memory 5b, in which the user program may be updated by the program controlling microcomputer 1. If the user program #2 is to be updated while being executed, a set point "4" is set in the register 6, and the subsequent process is the same as described above.

Figure 4:
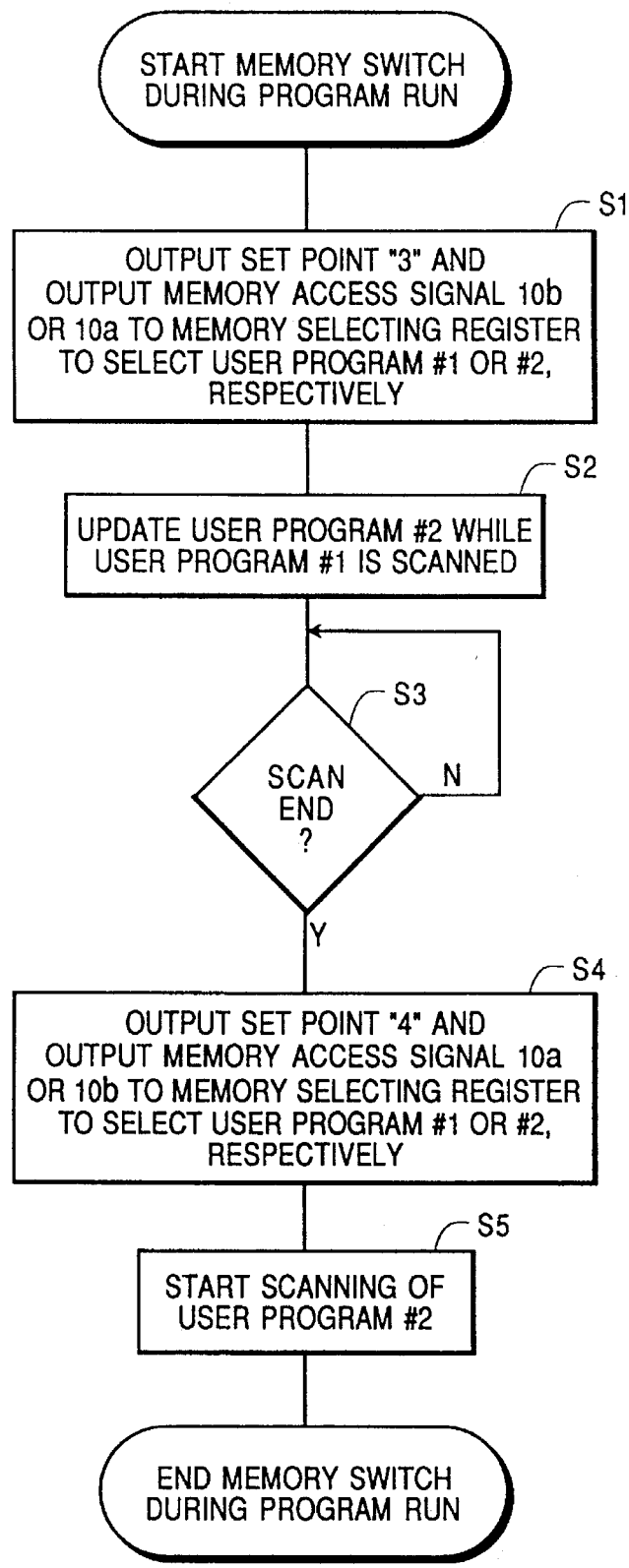
FIG. 4 is a flowchart illustrating the procedure for switching user programs to be executed.

FIG. 4 is flow chart of a procedure for replacing the user program #1 being executed with the user program #2 for new execution. At step 1, a set point "3" is set in the register 6 so that the program executing microcomputer 3 can execute the user program #1 by outputting memory access signal 10b. This in turn allows the program controlling microcomputer 1 to access the memory 5b by outputting memory access signal 10a when the sequencer bus 9 is not occupied. The microcomputer 1 stores the user program #2 into the memory 5b in step S2, and waits for the program executing microcomputer 3 to end its scanning of the user program #1. At the scan end, as detected in step S3, the program executing microcomputer 3 attempts to interrupt the program controlling microcomputer 1. The microcomputer 1 accepts the interruption, and in step S4 sets a set point "4" in the memory selecting register 6 to allow microcomputer 1 to access program #1 in memory 5a by outputting access signal 10a and microcomputer 3 to access program #2 in memory 5b by outputting access signal 10b. Thus, the address signal coming from the program executing microcomputer 3 allows the user program #2 to be accessed in the memory 5b (step S5). In this manner, the user program #1 may be replaced with the user program #2 for execution by the program executing microcomputer 3, effectively switching the memories to be accessed. The user programs are switched without the microcomputer 3 either becoming aware of the switch or interrupting the sequence of processing.

According to the invention, user programs are switched without interruption of the sequence processing, The invention also allows the newly selected user program to be verified before its execution.

While the present invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A programmable controller comprising:

a sequence processor for executing a user program stored in a memory;

a control processor for updating a user program stored in a memory;

a first memory for storing a first user program for accessing at an address of the first memory;

a second memory for storing a second user program for accessing at an address of said second memory identical to said address of said first memory;

bus means coupling said sequence processor and said control processor to said first and second memories; and a selector connected to said first and second memories and responsive to a mode control signal for enabling a selected one of said first and second memories to be accessed at said memory address via said bus means by said sequence processor or said control processor, said selector responding to a change in the mode control signal by enabling the other one of said first and second memories to be accessed at said memory address via said bus means by said sequence processor or said control processor without interrupting the sequence of processing.

2. A programmable controller according to claim 1, wherein said selector comprises means responsive to said mode control signal for enabling said first memory to be accessed by either said sequence processor or said control processor when said sequence processor or said control processor applies an access signal thereto, respectively.

3. A programmable controller according to claim 2, wherein said sequence processor comprises means for executing instructions in a plurality of operations in sequence during a single instruction cycle, wherein certain ones of said operations require use of said bus means and other ones of said operations do not require use of said bus means, and wherein said control processor comprises means for applying an access signal to said selector during said other ones of said operations.

4. A programmable controller according to claim 3, wherein said sequence processor further comprises means for applying an access signal to said selector only during said certain ones of said operations.

5. A programmable controller according to claim 3, wherein said mode control signal is applied to said selector from said control processor.

6. A programmable controller according to claim 1, wherein said selector comprises means responsive to the mode control signal for enabling said first memory to be accessed by said sequence processor when said sequence processor applies a first access signal to said selector and for enabling said second memory to be accessed by said control processor when said control processor applies a second access signal to said selector.

7. A programmable controller according to claim 6, wherein said sequence processor comprises means for executing instructions in a plurality of operations in sequence during a single instruction cycle, wherein certain ones of said operations require use of said bus means and other ones of said operations do not require use of said bus means, and wherein said control processor comprises means for applying the second access signal to said selector during said other ones of said operations.

8. A programmable controller according to claim 7, wherein said sequence processor further comprises means for applying the first access signal to said selector only during said certain ones of said operations.

9. A method of selecting user programs for execution by a sequence processor and for updating by a control processor in a programmable controller including the sequence processor, the control processor, a first memory for storing a first user program for accessing at an address of said first memory, a second memory for storing a second user program for accessing at an address of said second memory identical to said address of said first memory, and bus means coupling said first and second memories with said sequence processor and said control processor, the method comprising the steps of:

generating a mode signal identifying a particular one of said first and second memories to be enabled for access by said sequence processor and said control processor;

generating a first access signal in said sequence processor when said sequence processor requires access to one of said first and second memories;

generating a second access signal in said control processor when said control processor requires access to one of said first and second memories; and enabling the identified one of said first and second memories on the basis of the access signals and the mode signal, changing of the mode signal causing switching of the enabled one of said first and second memories so as to switch the user program being executed by said sequence processor without interrupting the sequence of processing.

10. A method according to claim 9, wherein said sequence processor executes instructions in a plurality of operations in sequence during a single instruction cycle, wherein certain ones of the operations require use of said bus means and other ones of said operations do not require use of said bus means, and wherein the second access signal is generated in said control processor during said other ones of said operations.

11. A method according to claim 10, wherein the first access signal is generated in said sequence processor only during said certain ones of said operations.

12. A method of selecting user programs for execution by a sequence processor and for updating by a control processor in a programmable controller including the sequence processor, the control processor, a first memory for storing a first user program for accessing at an address of said first memory, a second memory for storing a second user program for accessing at an address of said second memory identical to said address of said first memory, and bus means coupling said first and second memories with said sequence processor and said control processor, the method comprising the steps of:

generating one of a first mode signal and a second mode signal, the first mode signal enabling said first memory for access by said sequence processor and said second memory for access by said control processor, the second mode signal enabling said second memory for access by said sequence processor and said first memory for access by said control processor;

generating a first access signal in said sequence processor when said sequence processor requires access to one of said first and second memories;

generating a second access signal in said control processor when said control processor requires access to one of said first and second memories; and accessing said first and second memories on the basis of the access signals and the mode signal, changing of the executed one of said mode signals causing switching of the enabled condition of said first and second memories so as to switch the user program being generated by said sequence processor without interrupting the sequence processing.

13. A method according to claim 12, wherein said sequence processor executes instructions in a plurality of operations in sequence during a single instruction cycle, wherein certain ones of the operations require use of said bus means and other ones of the operations do not require use of said bus means, and wherein the second access signal is generated in said control processor during said other ones of the operations.

14. A method according to claim 13, wherein the first access signal is generated in said sequence processor only during said certain ones of said operations.

15. A programmable controller comprising:

a sequence processor for executing a user program stored in a memory;

a control processor for updating a user program stored in a memory;

a first memory for storing a first user program for accessing at an address of said first memory;

a second memory for storing a second user program for accessing at an address of said second memory identical to said address of said first memory;

bus means coupling said sequence processor and said control processor to said first and second memories; and a selector connected to said first and second memories and responsive to a mode control signal for enabling said first and second memories to be selectively accessed at said memory address via said bus means by said sequence processor, for execution on said sequence processor of the user program stored therein, and by said control processor, for updating by said control processor of the user program stored therein, said selector responding to changes in the mode control signal by switching the enabled one of said first and second memories so that the user program being executed by said sequence processor can be switched without interrupting of the sequence of processing.

16. For use in a programmable controller having a sequence processor, a control processor, a first memory for storing a first user program for accessing at an address of said first memory, a second memory for storing a second user program for accessing at an address of said second memory identical to said address of said first memory, and bus means coupling said first and second memories with said sequence processor and said control processor, a method of selecting a user program for execution by said sequence processor and of selecting a user program for updating by said control processor, said method comprising the steps of:

(a) generating a first access signal in said sequence processor when said sequence processor requires access to one of said first and second memories;

(b) generating a second access signal in said control processor when said control processor requires access to one of said first and second memories;

(c) generating a first mode signal when said first memory is to be enabled for accessing by one of said sequence processor and said control processor;

(d) generating a second mode signal when said second memory is to be enabled for accessing by one of said sequence processor and said control processor;

(e) in response to simultaneous presence of the first access signal and the first mode signal, providing access to said first memory by said sequence processor for execution of the first user program;

(f) in response to simultaneous presence of the second access signal and the first mode signal, providing access to said first memory by said control processor for updating of the first user program;

(g) in response to simultaneous presence of the first access signal and the second mode signal, providing access to said second memory by said sequence processor for execution of the second a user program; and (h) in response to simultaneous presence of the second access signal and the second mode signal, providing access to said second memory by said control processor for updating of the second user program, changing of the mode signals permitting switching of the user program being executed by said sequence processor without interrupting of the sequence of processing.

\* \* \* \* \*